United States Patent [19]
Au-Yeung et al.

[11] Patent Number: 6,134,362
[45] Date of Patent: Oct. 17, 2000

[54] SHORT LENGTH FUSED FIBER OPTICAL COUPLERS AND METHOD OF MAKING SAME

[75] Inventors: Vincent Au-Yeung, Los Altos; Guodong Hou, Cupertino; Jie Yuan Cao, Santa Clara, all of Calif.

[73] Assignee: U.S.A. Kaifa Technology, Inc., Sunnyvale, Calif.

[21] Appl. No.: 09/090,645

[22] Filed: Jun. 4, 1998

[51] Int. Cl.[7] ....................................................... G02B 6/26
[52] U.S. Cl. .................................. 385/43; 385/48; 385/96
[58] Field of Search .................................. 385/43, 95, 96, 385/46, 48, 42

[56] References Cited

U.S. PATENT DOCUMENTS

| | | | |
|---|---|---|---|
| 4,291,940 | 9/1981 | Kawasaki et al. | 350/96.15 |
| 4,426,215 | 1/1984 | Murphy | 65/4.21 |
| 4,449,781 | 5/1984 | Lightstone et al. | 385/43 |
| 5,339,374 | 8/1994 | Murphy et al. | 385/43 |
| 5,864,644 | 1/1999 | DiGiovanni et al. | 385/43 |

*Primary Examiner*—Phan T. H. Palmer
*Attorney, Agent, or Firm*—Lumen Intellectual Property Services

[57] ABSTRACT

A method of making short length fused fiber optical couplers and couplers made by the method. In a first step, fibers are fused by heating and pulled to form a taper section. Preferably, the fibers are twisted to assure good fusion. After pulling, in a second heating step, heat is applied to a portion of the taper section while the fibers are held stationary. The fibers are not pulled during the second heating step. The coupling ratio is monitored during the second heating step. The coupling ratio changes slowly during the second heating step and the heat is removed shortly before a desired coupling ratio is achieved. The residual heat continues to change the coupling until the desired coupling ratio is achieved. Couplers made according to the present method have a relatively short length. Couplers made according to the present method have a melted zone located in the taper section. The melted zone has a more rounded shape than the taper section due to surface tension. The melted zone is formed by the second heating step.

19 Claims, 5 Drawing Sheets

Coupling Ratio vs. Pulling Length

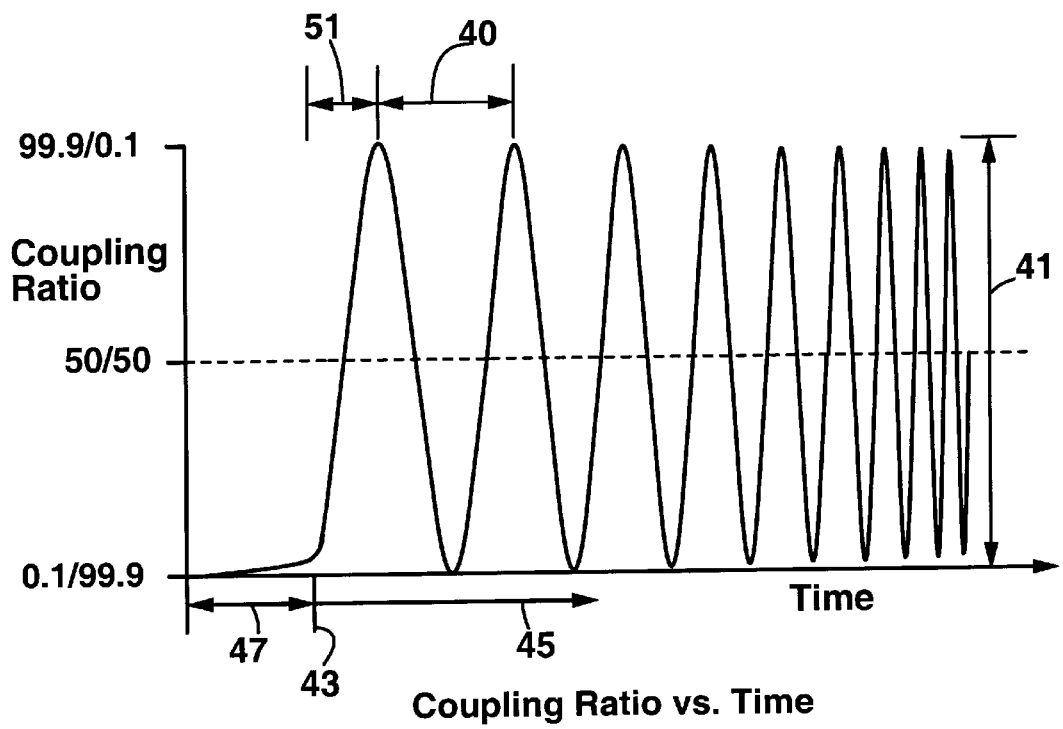
Fig. 6 Coupling Ratio vs. Time
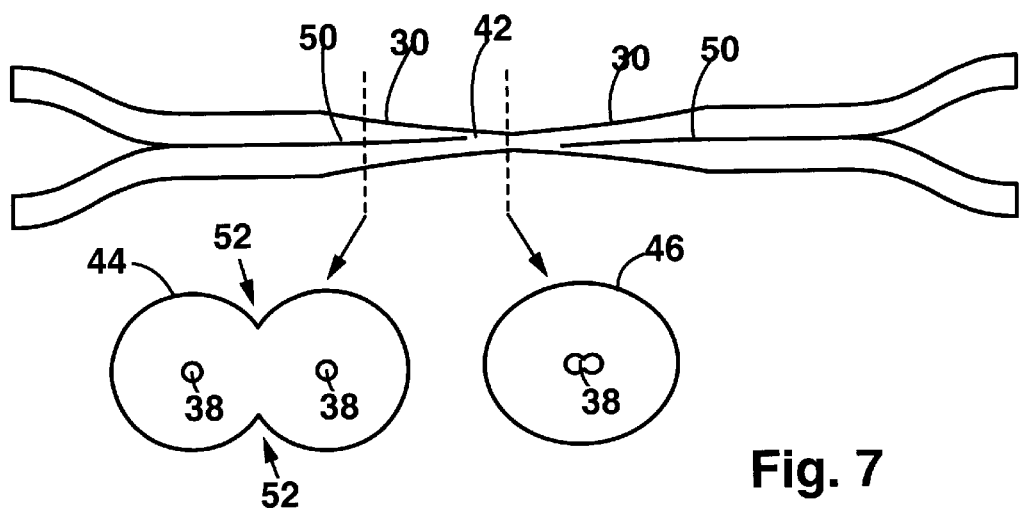
Fig. 7

SHORT LENGTH FUSED FIBER OPTICAL COUPLERS AND METHOD OF MAKING SAME

FIELD OF THE INVENTION

This invention relates generally to fiber optics. More particularly, it relates to fused fiber couplers having a short length and an accurate coupling ratio. The invention also relates to a method of making such fused fiber couplers.

BACKGROUND OF THE INVENTION

Optical fibers are commonly used to transmit information using light. Often it is necessary to remove a portion of the light traveling in an optical fiber or to inject light into an optical fiber already transmitting light. Fiber couplers are used in these applications. Fiber couplers are specified by their coupling ratio, which indicates what percentage of light will be removed from, or injected into an optical fiber. Couplers with coupling ratios within the range of 0.1/99.9 to 50/50 are useful in different applications.

A common type of fiber coupler used is a biconical fused fiber coupler. Such couplers are made by contacting two or more fibers along their length and then heating a short section of the fibers while pulling the fibers lengthwise. The heated section of the fibers stretches which reduces the diameter of the fibers in the heated region. The fibers are stretched until a desired coupling ratio is achieved. The stretched portion of the fibers acquires a biconical shape. The light-carrying cores of the fibers are reduced in diameter and move closer together, facilitating coupling of light between the cores of the fibers.

Biconical fiber couplers made in this way tend to be rather long. Typically, such couplers are about 4–6 cm long. This relatively long length can be a problem in many applications because of the high cost of space in optical fiber systems. It is highly desirable to minimize the size of optical components so that costs are reduced.

Prior art methods of making fused fiber couplers produce fiber couplers having a relatively inaccurate coupling ratio. This reduces the manufacturing yield, thereby increasing the cost. Also, inaccurately manufactured fiber couplers are difficult to use in wavelength division multiplexing applications where an accurately defined coupling ratio (typically 99.98/0.02) is very important to obtain wavelength-dependent coupling characteristics.

U.S. Pat. No. 4,291,940 to Kawasaki discloses a method of making biconical taper optical fiber couplers. Couplers made according to Kawasaki will be relatively long and therefore expensive to use in optical fiber systems.

U.S. Pat. No. 4,426,215 to Murphy discloses a method of making a biconical taper fiber coupler in which the fiber cores in the tapered section are scrambled by reheating and pushing the fibers together.

U.S. Pat. No. 5,339,374 to Murphy discloses a method of making a biconical taper fiber coupler in which the fibers are heated and twisted.

OBJECTS AND ADVANTAGES OF THE INVENTION

Accordingly, it is a primary object of the present invention to provide a method of making optical fiber couplers that:

1) has a high manufacturing yield;
2) produces optical fiber couplers with an accurate coupling ratio; and
3) produces optical fiber couplers which are short in length;
4) is sufficiently accurate to allow the couplers to be used in wavelength division multiplexing wavelength isolation applications.

Also, it is a further object of the present invention to provide optical fiber couplers that:

1) have an accurate coupling ratio;
2) are inexpensive;
3) can be used in wavelength division multiplexing applications; and
4) are short in length.

These and other objects and advantages will be apparent upon reading the following description and accompanying drawings.

SUMMARY OF THE INVENTION

These objects and advantages are attained by a method of making fused fiber couplers and couplers made by the method.

The method of the present invention begins with heating a heated length of a number of parallel optical fibers and pulling the fibers to form a taper section. Next, in a second heating step, the fibers are held stationary while heat is applied to a portion of the taper section.

Heat is applied to the portion until a desired coupling ratio is achieved. The coupling ratio is monitored during the entire process.

Preferably, the fibers are twisted before or during the heating/pulling steps. This helps to assure good fusion between the fibers.

Preferably, the fibers are pulled a total distance of about two times the length of the heated length. The heated length is about 3–5 millimeters long and the total pulling distance is about 5–10 millimeters.

The present invention includes fiber couplers made according to the above method. Such optical fibers have a number of fused optical fibers fused along a taper section. A melted zone located within the taper section has a more rounded shape than the taper section. The melted zone provides strong field coupling between the optical fibers.

The melted zone is formed by the second heating step of the method of the present invention. Preferably, the melted zone is about 3–5 millimeters long and the taper section is about 5–10 millimeters long.

Cores of the optical fibers can be fused within the melted section. Cores of the optical fibers tend to be closer to one another within the melted zone than within the taper section.

Preferably, the melted zone is located in the center of the taper section.

DESCRIPTION OF THE FIGURES

FIG. 6 shows the evolution of the coupling ratio during the second heating step.

FIG. 7 shows a finished fiber coupler according to the present invention.

DETAILED DESCRIPTION

The present invention includes an improved method of making optical fiber couplers and couplers made according to the method.

Figure 1:
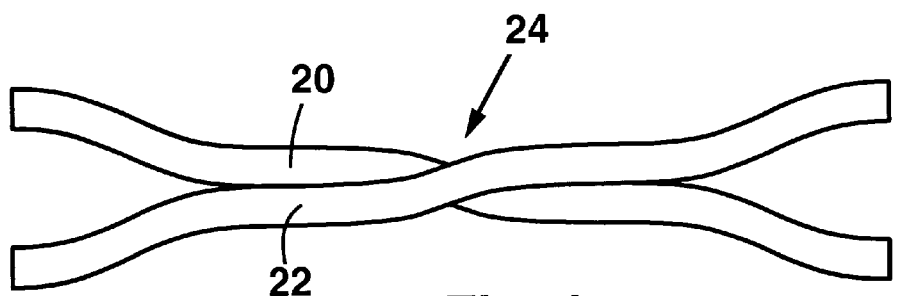
FIG. 1 shows a first step in the method of the present invention.

FIG. 1 shows a first step in the manufacture of optical fiber couplers according to the present invention. Here, two fibers 20, 22 are disposed next to one another and twisted a half twist 24. The twist 24 is preferred but not necessary for performing the method of the present invention. Further, the twist 24 is preferably a half twist, as shown. Alternatively, the fibers can be twisted by one or more full twists. Also, more than two fibers can be used.

Figure 2:
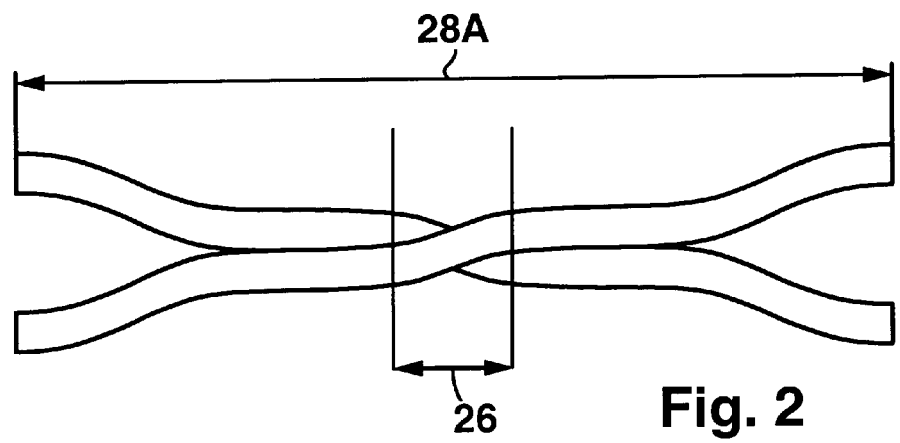
FIG. 2 shows a step in which the fibers are heated.

FIG. 2 shows the next step. Here, heat is applied to a heated length 26. The heated length is preferably about 3–3.5 millimeters long, but can be anywhere in the range of 3–5 millimeters long. It is difficult to apply heat to a length shorter than about 3 mm. Heat is applied with a hydrogen flame, but other heating techniques known in the art of fused fiber coupler manufacturing can also be used. The hydrogen flame has a temperature of about 1480° C. The fibers can be twisted before or after they are heated as is known in the art.

The heat applied in the step of FIG. 2 causes the fibers 20, 22 to fuse as is known in the art. The twist 24 helps assure that the fibers 20, 22 are in good contact and therefore are securely fused together.

Figure 3A:
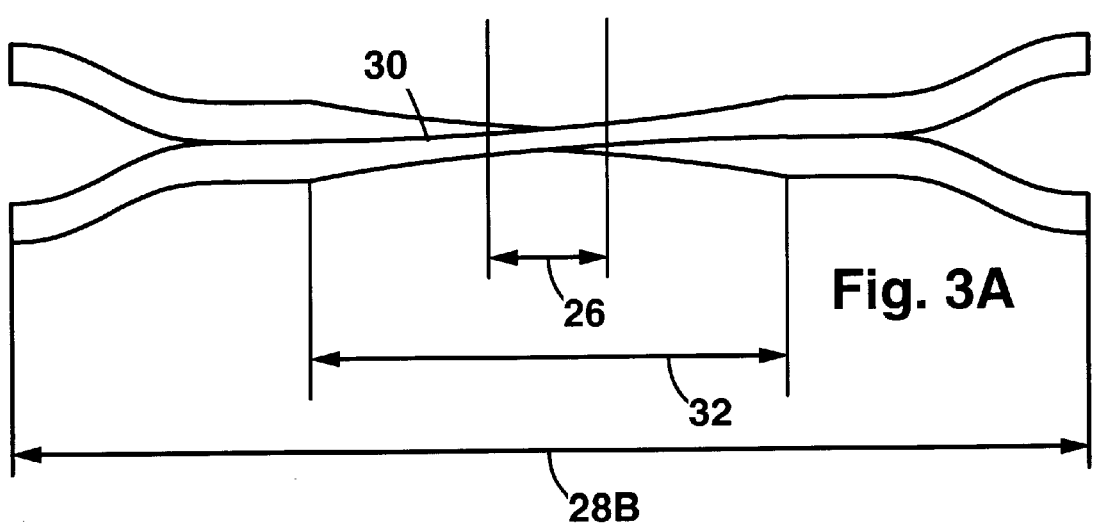
FIG. 3A shows a step in which the fibers are pulled to form a taper section.

Next, as shown in FIG. 3A, the fibers 20, 22 are pulled while being heated. Pulling forms a fused taper section 30. The length, which the fibers are pulled is determined by monitoring the coupling ratio as described below. Preferably, the total length pulled (length 28B minus length 28A (see FIG. 2)) is about two times the length of the heated length 26. The length 32 of the taper section 30 is determined by the total pulling length 28B–28A. The total length that the fibers are pulled is typically in the range of about 5–10 millimeters. The length of the heated length 26 and the pulled length determine the final length of the fiber coupler made by the method of the present invention. The total length of a completed, packaged coupler made by the present invention can be about 20–25 millimeters long.

Figure 3B:
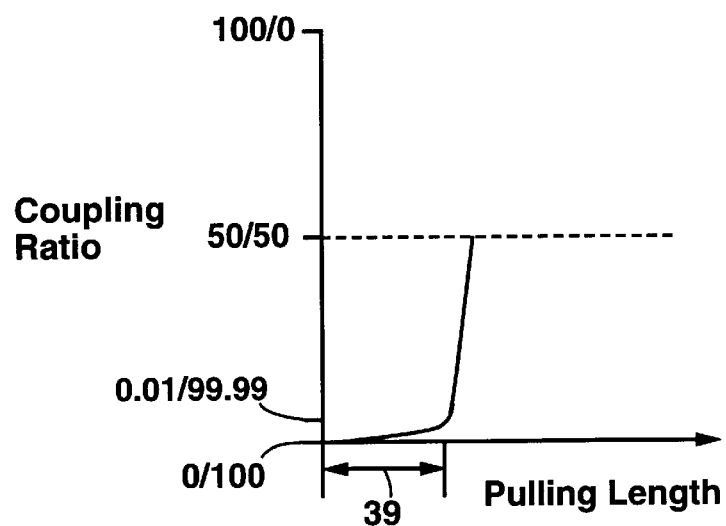
FIG. 3B shows a graph of coupling ratio versus pulling length during the step of FIG. 3A.
Figure 4:
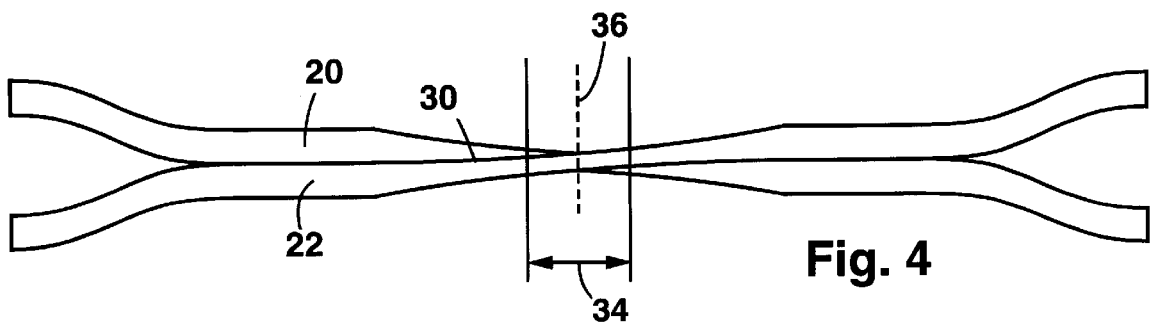
FIG. 4 shows a second heating step in which a portion of the taper section is heated without the fibers being pulled.

Next, as shown in FIG. 4, the pulling is stopped and the fibers 20, 22 are held stationary. The pulling length is preferably determined by the change in coupling ratio while the fibers are being pulled. FIG. 3B shows a graph of coupling ratio vs. pulling length for a coupler made according to the present invention. As the fibers are pulled, the coupling ratio changes very little at first and then suddenly begins to increase rapidly. Preferably, pulling is stopped when the coupling ratio starts to increase rapidly. Alternatively, pulling is stopped when the coupling ratio exceeds a threshold value. In a specific example, pulling is stopped when the coupling ratio exceeds about 0.01/99.99. The resultant pulling length is indicated by a pulling length 39. For many optical fiber couplers, length 39 is about 5–10 mm when the heated length 26 is about 3–5 mm. All the couplers made in a manufacturing run will be pulled to nearly the same length. Of course, identical process parameters (type of fiber and heating temperature) must be used for all the couplers.

However, the pulling can continue slightly after the coupling ratio begins to change rapidly, or can be stopped slightly before the coupling ratio begins to change rapidly. The pulling does not have to be ceased at the exact moment that the coupling ratio begins to change rapidly.

Alternatively, the pulling length 39 is predetermined by measuring an appropriate pulling length 39 for a number of test couplers. The predetermined pulling length is selected such that the coupling ratio is close to the point where it begins to change rapidly. Subsequent couplers are then pulled to the predetermined length without monitoring the coupling ratio. This results in all the couplers made during a manufacturing run having the same length. Of course, identical process parameters (type of fiber and heating temperatures) must be used for all the couplers.

Referring back to FIG. 4, after the pulling is stopped, a heated portion 34 of the taper section 30 is heated with the fibers being held stationary. Preferably, the heat applied to the portion 34 in the second heating step is from the same source as the heat applied in the step of FIGS. 2 and 3A. Preferably, the heat source stays on continuously from the pulling/heating step through the second heating step. The same hydrogen flame can be used for both the heating/pulling step and second heating step, for example. Also preferably, the length of portion 34 is the same as the length of the heated length 26. However, the length of portion 34 can be longer or shorter than the length of the heated length 26. This can be accomplished by increasing or decreasing the size of the hydrogen flame after the pulling is stopped.

The coupling ratio is monitored during the second heating step. Monitoring is performed using well-known techniques which include passing an optical signal through the coupler and measuring the light output in the different fibers of the coupler.

FIGS. 5A–5E illustrate what happens to the portion 34 of the taper section 30 during the second heating step of FIG. 4. FIGS. 5A–5E are cross sectional views cut through the middle 36 of the heated portion 34 of FIG. 4.

Figure 5A:
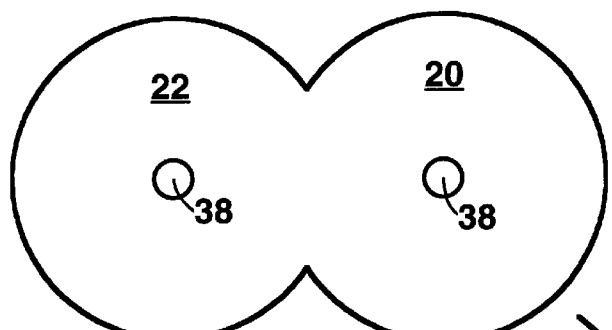
FIGS. 5A–5E show the evolution over time of the shape of the portion heated during the second heating step.
Figure 5B:
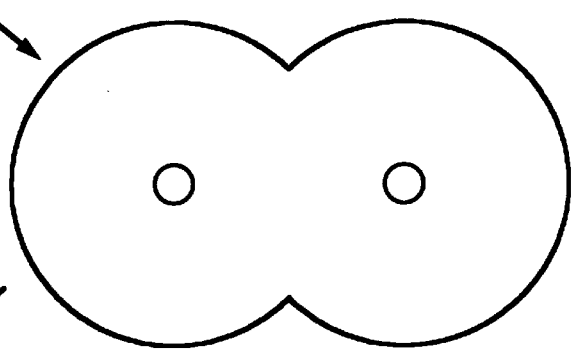
Figure 5C:
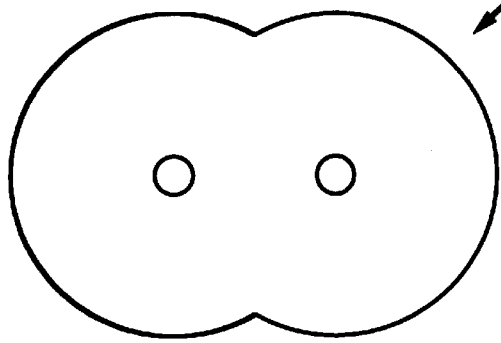
Figure 5D:
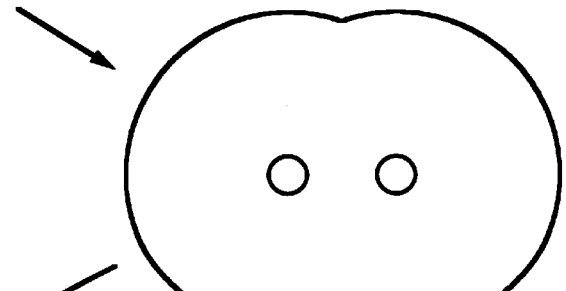
Figure 5E:
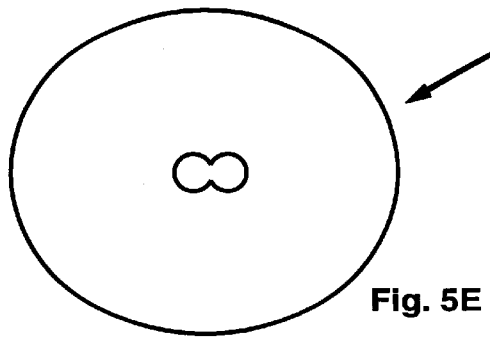

FIG. 5A shows the cross sectional view of the portion 34 at the beginning of the second heating step, immediately after pulling is stopped. Each fiber 20, 22 has a core 38. The cores are relatively far apart and the fibers still largely retain their individual shapes. FIGS. 5B–5E show the evolution of the cross sectional shape of the portion 34 during the second heating step. As heat is applied, the softened fibers 20, 22 fuse more completely, bringing the cores 38 closer together. In FIG. 5E, the cores 38 are fused together. The fibers are almost completely rounded in FIG. 5E. It is noted that the cores 38 may or may not be fused together in the heated portion 34 of couplers made according to the present invention.

FIG. 6 shows a graph of coupling ratio versus time during the method of the present invention. The duration of the first heating and pulling step 47 is shown. Preferably, the pulling is stopped and the second heating step starts at the point 43 when the coupling ratio begins to change rapidly. The coupling ratio oscillates during the second heating step 45 as the fibers are melted together in the portion 34. The 'amplitude' 41 of the coupling ratio oscillations decreases slightly as the second heating step progresses. The coupling ratio oscillations have a period 40 which also decreases as the second heating step progresses. The coupling ratio is monitored during the second heating step. The second heating step is terminated slightly before the desired coupling ratio is achieved. Residual heat in the portion 34 continues to change the coupling ratio to the desired value after the heat is removed. The residual heat carries the process to completion. The method of the present invention can produce couplers having almost any coupling ratio (e.g. from 0.1/ 99.9–99.9/0.1).

The appropriate time at which the second heating step is terminated is determined by calibrating the process with test samples. In this way, a correspondence is established between the final coupling ratio and the coupling ratio at the time the second heating step is terminated. The test samples provide information on how soon before the desired coupling is achieved the heating should be terminated.

A significant benefit of the present invention is that the coupling ratio changes slowly during the second heating step. The coupling ratio oscillations shown in FIG. 6 have a relatively long period 40 compared to the period of the coupling ratio oscillations when using prior art techniques. Typically, the period 40 in the method of the present invention is about 2–5 minutes. The slow changes in the coupling ratio allow the second heating step to be stopped at a point which renders a precise coupling ratio. A coupler made by the present method thus has an accurate coupling ratio, controllable to within about 0.05%. Precise, consistent control of the final coupling ratio is beneficial because it increases the manufacturing yield if a certain coupling ratio is desired. Preferably, the second heating step is terminated in the first half period 51 for 0.1%–50% splitting couplers. For wavelength division multiplexing couplers, the second heating step is terminated after more than one coupling period. The second heating step is longer when making couplers for wavelength division multiplexing applications because the couplers are more highly wavelength selective if manufactured with a long second heating step.

FIG. 7 shows a finished fiber coupler made according to the method of the present invention. The second heating step has formed a melted zone 42 located within the taper section 30. FIG. 7 also shows a cross sectional view 44 of the taper section 30 and a cross sectional view 46 of the melted zone 42 The melted zone 42 is smoother and has a more rounded shape than the taper section 30. Surface tension in the heated portion 34 has caused the melted zone 42 to have a more rounded shape than the taper section 30.

In FIG. 7, lines 50 indicate indentations 52 in the fused fibers which can be seen in the cross sectional view 44 of the taper section 30. In the specific embodiment of FIG. 7, the indentations 52 are not present in the melted zone 42. However, in other embodiments of the present invention, indentations may be present in the melted zone 42. In such couplers, indentations in the melted zone 42 will be smaller than the indentations in the taper section 30. The melted zone has a more rounded shape than the remainder of the taper section The extent of indentations in the melted zone depends upon the duration and temperature of the second heating step, which depends upon the desired coupling ratio, among other factors.

In the example of FIG. 7 the cores 38 of the fibers in the melted zone 42 have been almost completely fused together. This is not necessarily the case with fiber couplers made according to the present invention. The cores 38 in the melted zone 42 may still be separate when the fiber coupler is finished. The proximity of the cores 38 to one another depends upon the duration and temperature of the second heating step, which depends upon the desired coupling ratio, among other factors. The cores 38 are closer to one another in the melted zone 42 than in the taper section 30.

Preferably, the melted zone 42 is located in the center of the taper section 30. However, it is possible to have the melted zone 42 located asymmetrically with respect to the taper section 30.

An advantage of the present invention is that the length of the finished fiber coupler is short. The total length of the coupler is largely determined by the distance that the fibers are pulled in the step of FIG. 3A. The total length of a coupler (coupler plus package) made according to the present invention can be about 25 millimeters. This is much shorter than couplers made according to prior art techniques which are often about 40–60 millimeters long. Also, since the pulled length is identical or nearly identical for different couplers, all couplers made during a particular manufacturing run have substantially the same length.

Couplers of the present invention have a coupling ratio which is not the same for all wavelengths. The accurate control over the coupling characteristics of the couplers also allows accurate control of the wavelength at which particular coupling ratios are provided. The couplers can therefore act as filters for wavelength division multiplexing applications where different wavelengths of light need to be separated or combined. The couplers of the present invention can provide discrimination in coupling ratio for different wavelengths. This allows the signals to be separated or combined by a coupler of the present invention. The present invention provides couplers with high wavelength isolation which are quite useful in wavelength division multiplexing applications.

It is noted that, for wavelength discriminating applications, it is beneficial to make the couplers with a relatively long second heating step. A longer second heating step produces a coupler which is better able to distinguish between closely spaced wavelengths. If the second heating step is extended to about 30–40 periods, then the couplers can discriminate between wavelengths separated by only 3–4 nm. For example, such a coupler could separate light signals at 1480 and 1485 nm. Reference can be made to "High-Isolation Single-Mode Wavelength-division Multiplexer/Demultiplexer" in Electronics Letters, Vol. 22, No. 2, Jan. 16th, 1986 for information on the use in WDM systems of couplers which have been made by processing through many coupling ratio oscillations.

Figure 8:
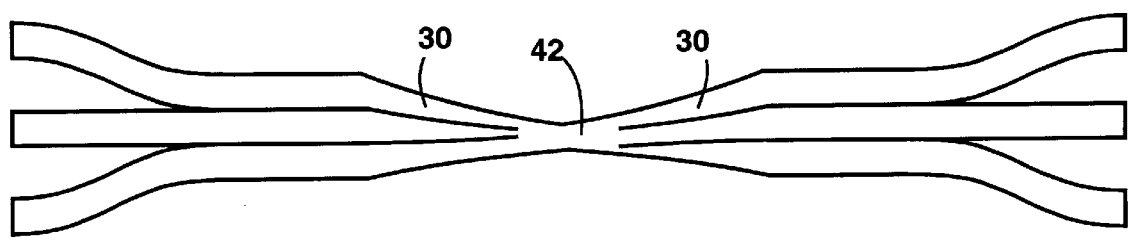
FIG. 8 shows a finished fiber coupler made from three optical fibers made according to the present invention.

The present invention can be applied to fiber couplers with 3 or more fibers. FIG. 8 shows a fiber coupler according to the present invention made from 3 fibers. The coupler has a melted zone 42 and a taper region 30. The method of making a coupler with more than two fibers is substantially the same as with two fibers. The fibers are all heated, fused, and then pulled as described above. In the second heating step, the fibers are heated until the coupler has the desired coupling ratio. However, the coupling ratio between every possible pair of fibers cannot be individually controlled. The coupling ratio can only be controlled for a particular pair of fibers in the coupler. For example, if a coupler has 5 fibers, only two of the fibers will have an accurately controlled coupling ratio.

It will be clear to one skilled in the art that the above embodiment may be altered in many ways without departing from the scope of the invention. Accordingly, the scope of the invention should be determined by the following claims and their legal equivalents.

What is claimed is:

1. A method of making an optical fiber coupler comprising the steps of:

a) disposing a plurality of optical fibers in a parallel fashion;

b) heating a heated length of the plurality of optical fibers;

c) pulling the heated length a distance of a pulling length to form a taper section within which the fibers are fused; and d) melting a portion of the taper section while holding the optical fibers stationary to form within the taper section a melted zone having a more rounded shape than the taper section.

2. An optical fiber coupler made according to the method of claim 1.

3. The method of claim 1 further comprising the step of twisting the optical fibers after step (b).

4. The method of claim 1 further comprising the step of twisting the optical fibers before step (b).

5. The method of claim 1 wherein the pulling length of step (c) is about twice the length of the heated length.

6. The method of claim 1 wherein the heating of step (d) is terminated before a desired coupling ratio between a pair of the optical fibers is achieved.

7. The method of claim 1 further comprising the step of monitoring a coupling ratio between a pair of the optical fibers during step (d).

8. The method of claim 1 wherein the fibers are pulled a pulling length of about 5–10 millimeters.

9. The method of claim 1 wherein the heated length is about 3–5 millimeters long.

10. The method of claim 1 wherein step (d) is performed for a duration longer than about 5 coupling ratio oscillations.

11. The method of claim 1 wherein step (c) is ceased when a coupling ratio between a pair of the optical fibers begins to change rapidly.

12. The method of claim 1 wherein step (c) is ceased when a coupling ratio between a pair of the optical fibers exceeds about 0.01/99.99.

13. The method of claim 1 wherein exactly two optical fibers are disposed in step (a).

14. An optical fiber coupler comprising:
 a) a plurality of fused optical fibers disposed in a substantially parallel relationship;
 b) a taper section where the optical fibers are fused; and
 c) a melted zone located within the taper section, wherein the melted zone has a more rounded shape than the taper section, and wherein the melted zone is made of the fused optical fibers;
 and wherein the optical fiber coupler is monolithic and comprises continuous optical fibers.

15. The optical fiber coupler of claim 14 wherein the melted zone is about 3–5 millimeters long.

16. The optical fiber coupler of claim 14 wherein the fused taper section is about 5–10 millimeters long.

17. The optical fiber coupler of claim 14 wherein cores of the optical fibers are fused in the melted zone.

18. The optical fiber coupler of claim 14 wherein cores of the optical fibers are closer to one another in the melted zone than in the taper section.

19. The optical fiber coupler of claim 14 wherein the melted zone is located in the center of the taper section.

* * * * *